(12) United States Patent
Nassimi

(10) Patent No.: US 7,085,543 B2
(45) Date of Patent: Aug. 1, 2006

(54) MODULAR BASE PLATE FOR WIRELESS DEVICE

(76) Inventor: Shary Nassimi, 2002 NW. 215 Cir., Ridgefield, WA (US) 98642

( * ) Notice: Subject to any disclaimer, the term of this patent is extended or adjusted under 35 U.S.C. 154(b) by 572 days.

(21) Appl. No.: 10/328,400

(22) Filed: Dec. 23, 2002

(65) Prior Publication Data

US 2004/0203521 A1    Oct. 14, 2004

(51) Int. Cl.
*H04B 1/38* (2006.01)
(52) U.S. Cl. ............... 455/90.3; 455/455; 455/100; 455/347; 455/569.1; 455/575.1; 455/344; 381/74; 381/370; 379/430
(58) Field of Classification Search .......... 455/90.3, 455/95, 575.1, 575.2, 575.4, 575.6, 575.8, 455/575.9, 569.1, 569.2, 344, 347, 348, 100, 455/899; 379/430; 381/74, 370
See application file for complete search history.

(56) References Cited

U.S. PATENT DOCUMENTS

| | | | | |
|---|---|---|---|---|
| 4,420,657 | A * | 12/1983 | Larkin | 379/430 |
| 5,590,417 | A * | 12/1996 | Rydbeck | 455/575.2 |
| 5,884,199 | A * | 3/1999 | Maki | 455/575.1 |
| 6,320,959 | B1 * | 11/2001 | Crouch et al. | 379/430 |
| 6,591,085 | B1 * | 7/2003 | Grady | 455/42 |
| 6,712,304 | B1 * | 3/2004 | Taylor | 242/379 |
| 6,728,556 | B1 * | 4/2004 | Whitley | 455/575.1 |
| 2001/0035242 | A1 * | 11/2001 | Hughs et al. | 150/154 |
| 2002/0098877 | A1 * | 7/2002 | Glezerman | 455/568 |
| 2004/0125979 | A1 * | 7/2004 | Elidan et al. | 381/382 |

* cited by examiner

*Primary Examiner*—Nay Maung
*Assistant Examiner*—Shaima Q Aminzay
(74) *Attorney, Agent, or Firm*—George R. McGuire; Bond, Schoeneck & King, PLLC

(57) ABSTRACT

The present invention teaches that a small standardized plate may be affixed to a cellular telephone or item of office equipment. The plate has a first fastener portion. The base unit of a wireless headset and base unit device is equipped with a second fastener portion which cooperates with the first fastener portion on the plate to secure the base unit to the plate and thus to the cellular telephone or office equipment. The plate may be permanently affixed to the surface of the telephone or other item by such means as adhesives, because when it is necessary to remove the base unit from the surface, it may be unfastened from the plate, leaving the plate in place. The fasteners used may be metal snaps, plastic snaps, hooks, clasps, clips, fabric hooks, magnets, latches and combinations thereof. In alternative embodiments, there may be extra fasteners.

In embodiments, the fasteners may be standardized in type, dimension and configuration so as to allow interoperability and portability of the base units: a given base unit may be removed from a given surface and replaced with another base unit, or transferred to another surface equipped with a plate of the invention.

The second fastener portion may be adhesively affixed to the base unit, may be integral with the base unit or may be otherwise attached to the base unit in a manner which may be permanent.

10 Claims, 5 Drawing Sheets

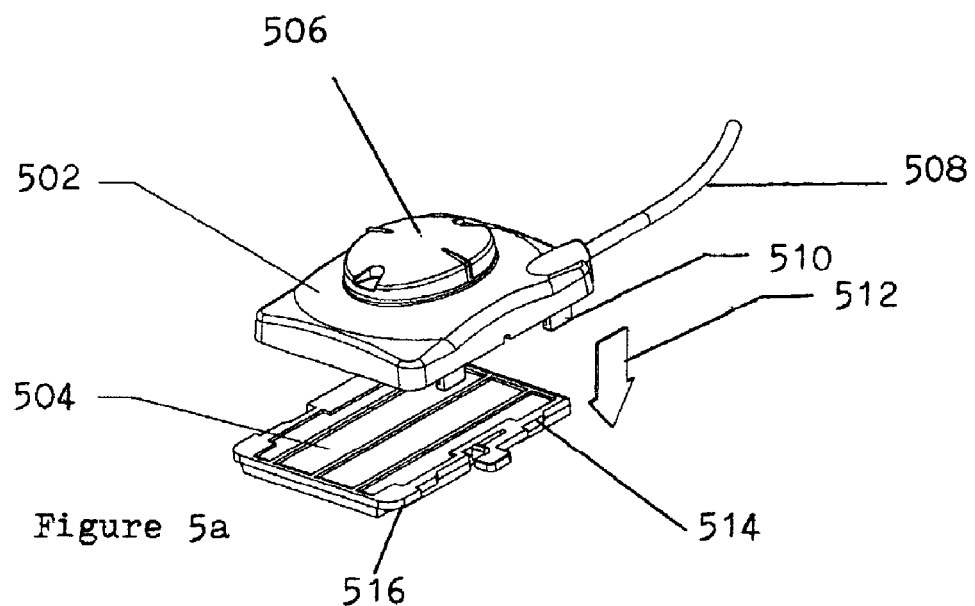
Figure 5a
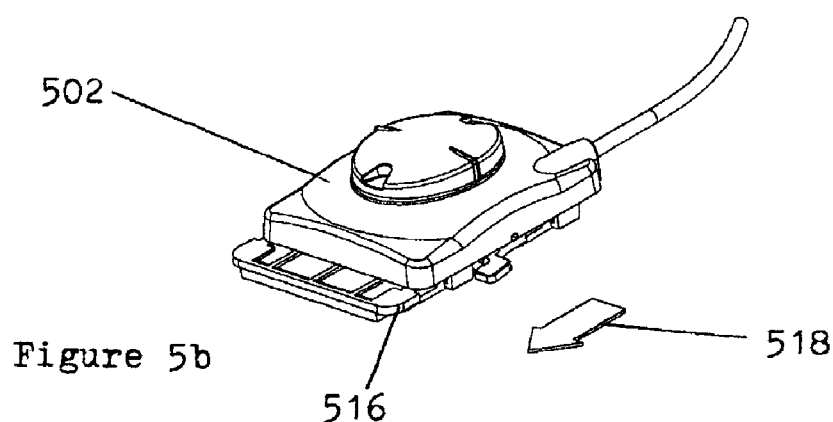
Figure 5b
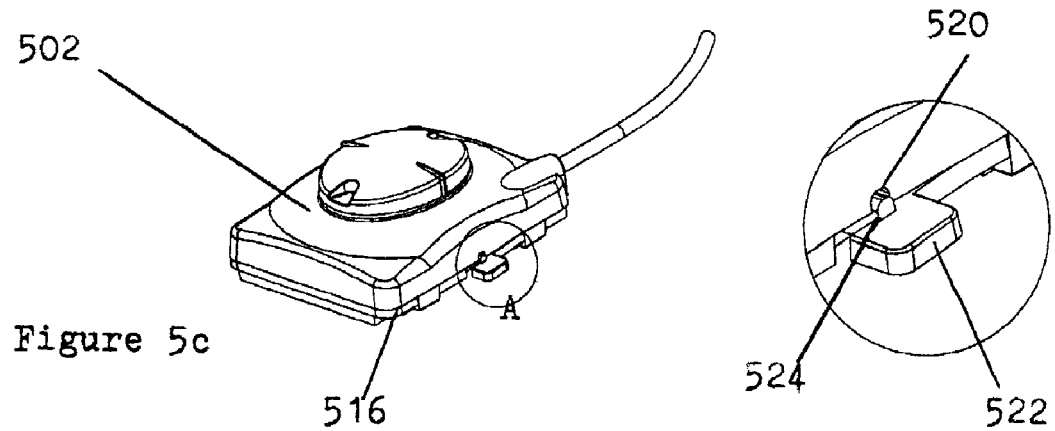
Figure 5c
Figure 5d

MODULAR BASE PLATE FOR WIRELESS DEVICE

FIELD OF THE INVENTION

This invention relates generally to wireless headsets and more specifically to a modular base plate used to attach the base unit of a wireless headset to another device.

BACKGROUND OF THE INVENTION

Increasing use of telephones and telephone-like audio communications devices has required the development of labor and time saving devices. Various types of "cell telephone holders" for vehicles are known, for example, U.S. Pat. No. 6,490,437 issued Dec. 3, 2002, to Bisplinghoff. Such devices basically hold the cell phone while a driver uses it.

A different popular device is the wireless headset. By wearing a headset having earphones and a microphone, a user can escape the need to continuously hold an office telephone or cellular telephone or other audio input/output device up to one ear. In operation of the wireless headset the headset device itself and a base device communicate by means of RF transmissions. The base device is then physically attached to an office telephone, a cellular telephone or similar device. There have been various attempts to provide a way to hold a cell phone to a user's ear, or to combine the operations of the cell phone and base unit. Examples include U.S. Pat. No. 6,374,090 issued Apr. 16, 2002, U.S. Pat. No. 6,269,259 issued Jul. 31, 2001, to Lai, and U.S. Pat. No. 5,590,417 issued Dec. 31, 1996 to Rydbeck. If any of these have actually appeared on the market, they are presently unknown to applicant. None disclose any structure similar to the present invention.

Wireless headsets offer enormous time savings to office workers due to the hands free mode of operation provided. The user wears the wireless headset with microphone and speakers, leaves the base unit safely tucked away, and need not use one or more hands to hold a telephone handset or control the base device. Thus in a broad range of applications, the device of the present invention may be used to provide convenience and increase productivity: secretarial work, telemarketing, office work, etc.

Various wireless headsets schemes have been proposed. In general, the headset unit itself and the base unit with which it communicates are both made as small as possible. In the case of the base unit, this means that a device of ever shrinking proportions is being placed next to an office telephone and other full sized office equipment. This in turn makes it easy for an accident to occur in the office setting: the base unit may get damaged due to having something heavy set on it, the base unit may be detached during usage and so on.

Another use of wireless headsets revolves around mobile use in conjunction with cellular telephones. In general, the base unit must be securely attached to the cellular telephone. Now the problem is doubled: a very small base unit must be attached to a cellular telephone which may itself be quite small. U.S. Pat. No. 5,426,689 issued Jun. 20, 1995 to Griffith et al for CORDLESS HEADSET TELEPHONE FOR USE WITH A BUSINESS TELEPHONE displays in FIG. 1 a base unit (base station 102) which is of a size comparable to a business telephone: this unit is obviously impossible to use with a cellular telephone. U.S. Pat. No. 5,487,182 issued Jan. 23, 1996 to Hansson for HANDS-FREE MODULE teaches a module which must be customized for each model of cellular telephone: it cannot be retrofitted to any type of telephone but the one for which it was designed. This enormously increases costs and decreases user convenience.

For safety reasons, a base unit to telephone attachment must be secure, despite the diminutive size of both devices. One major purpose of such headsets is reduce the danger of accidents while using a cellular telephone during driving, exercise sessions and other mobile activities. This purpose is defeated if the user is forced to hold a base unit in secure connection with the cellular telephone.

Unfortunately, devices on the market tend to be extremely unreliable: loose clips, adhesives and so on. At least with the use of adhesives, a high strength adhesive will provide a quality product. But this reliability then comes at the expense of more or less permanently affixing the base unit to a single cellular device/office device. In fact, attempts to remove a wireless base unit from a telephone or similar device could easily damage either the base unit or the telephone. Use of a re-usable "tacky" adhesive allows the base unit to fall off of the cellular/office device and reliability is lost.

Magnetic devices are normally unacceptable for use on delicate electronics having RF equipment, memory chips, etc. In any case, most modern office/cellular devices have nonmagnetic plastic housings.

One device of interest does not provide a flat plate nor a fastener as understood in the present invention, but at least allows mounting of a telecommunication interface to a flat surface in a more or less permanent way, with all of the disadvantages previously discussed. U.S. Pat. No. 6,223,062 issued Apr. 24, 2001 and entitled COMMUNICATIONS INTERFACE ADAPTER teaches this device. It appears largely unrelated to the field of wireless headsets for office or personal use.

It would be advantageous to provide a modular, reusable, flexible and standardized method of attaching the base unit of a wireless headset to a telephone, item of office equipment, cellular telephone or other device, provide a very high degree of security, and yet allow the user to easily remove the base unit from the telephone or other device and replace it or place it in a different location.

SUMMARY OF THE INVENTION

General Summary

The present invention teaches that a small standardized plate may be affixed to a cellular telephone or item of office equipment. The plate has a first fastener portion. The base unit of a wireless headset and base unit device is equipped with a second fastener portion which cooperates with the first fastener portion on the plate to secure the base unit to the plate and thus to the cellular telephone or office equipment. The plate may be permanently affixed to the surface of the telephone or other item by such means as adhesives, because when it is necessary to remove the base unit from the surface, it may be unfastened from the plate, leaving the plate in place. The fasteners used may be metal snaps, plastic snaps, hooks, clasps, clips, fabric hooks, magnets, latches and combinations thereof. In alternative embodiments, there may be extra fasteners.

In embodiments, the fasteners may be standardized in type, dimension and configuration so as to allow interoperability and portability of the base units: a given base unit may be removed from a given surface and replaced with another base unit, or transferred to another surface equipped with a plate of the invention.

The second fastener portion may be adhesively affixed to the base unit, may be integral with the base unit or may be otherwise attached to the base unit in a manner which may be permanent.

Summary in Reference to Claims

It is therefore a first aspect, advantage, objective and embodiment of the present invention to provide a device for fastening a base unit of a wireless headset to a surface, the device comprising: a substantially flat plate having first and second sides; the plate having upon the first side a first fastener portion; the plate further having upon the second side means for affixing the plate to such surface; a second fastener portion affixed to such base unit; wherein the first and second fastener portions are dimensioned and configured to engage one another.

It is therefore a second aspect, advantage, objective and embodiment of the present invention to provide a device wherein the plate further comprises: a first immovable tab portion; a second movable tab portion having a detent thereon; and wherein the base unit further comprises: a notch; a projection having a hook; wherein the detent and notch are dimensioned and configured to engage together when the base unit is secured to the plate; and further wherein the first immovable tab portion and the projection are dimensioned and configured to engage together when the base unit is secured to the plate.

It is therefore yet another aspect, advantage, objective and embodiment of the present invention to provide a device further comprising: a third fastener portion upon the first side of the plate; and a fourth fastener portion affixed to such base unit.

It is therefore yet another aspect, advantage, objective and embodiment of the present invention to provide a device wherein the first and second fastener portions together comprise one member selected from the group consisting of: metal snaps, plastic snaps, hooks, clasps, clips, fabric hooks, magnets, loops, detents, latches and combinations thereof.

It is therefore yet another aspect, advantage, objective and embodiment of the present invention to provide a device wherein the means for affixing the plate to such surface further comprises an adhesive.

It is therefore yet another aspect, advantage, objective and embodiment of the present invention to provide a device wherein the planform of the plate is one member selected from the group consisting of: circular shapes, elliptical shapes, rectangular shapes, elongate shapes, triangular shapes, square shapes, trapezoidal shapes, regular geometrical shapes, irregular shapes and combinations thereof.

It is therefore yet another aspect, advantage, objective and embodiment of the present invention to provide a device wherein the dimensions and configurations of the first and second fastener portions are standardized; whereby interoperability and portability of a plurality of base units among a plurality of surfaces is maintained.

It is therefore yet another aspect, advantage, objective and embodiment of the present invention to provide a device for fastening a base unit of a wireless headset to a surface, the device comprising: a first substantially flat plate having first and second sides; the first plate having upon the first side a first fastener portion; the first plate further having upon the second side means for affixing the plate to such surface; a second substantially flat plate having third and fourth sides; the second plate having upon the third side a second fastener portion; the second plate further having upon the fourth side means for affixing the plate to such wireless headset base unit; wherein the first and second fastener portions are dimensioned and configured to engage one another.

It is therefore yet another aspect, advantage, objective and embodiment of the present invention to provide a device wherein the first and second fastener portions together comprise one member selected from the group consisting of: metal snaps, plastic snaps, hooks, clasps, clips, fabric hooks, magnets, loops, detents, latches and combinations thereof.

It is therefore yet another aspect, advantage, objective and embodiment of the present invention to provide a device wherein the means for affixing the first plate to such surface further comprises an adhesive.

It is therefore yet another aspect, advantage, objective and embodiment of the present invention to provide a device wherein the planform of the first plate is one member selected from the group consisting of: circular shapes, elliptical shapes, rectangular shapes, elongate shapes, triangular shapes, square shapes, trapezoidal shapes, regular geometrical shapes, irregular shapes and combinations thereof.

It is therefore yet another aspect, advantage, objective and embodiment of the present invention to provide a device wherein the dimensions and configurations of the first and second fastener portions are standardized; whereby interoperability and portability of a plurality of base units among a plurality of surfaces is maintained.

It is therefore another aspect, advantage, objective and embodiment to provide a base unit for a wireless headset, the base unit suitable for being secured to a surface, the base unit comprising: a case having disposed therein transceiver circuitry in communication with such wireless headset; a first fastener portion upon the case; a plate having a first and second side, the plate having upon the first side a second fastener portion; the plate further having upon the second side means for affixing the plate to such surface; wherein the first and second fastener portions are dimensioned and configured to engage one another.

BRIEF DESCRIPTION OF THE DRAWINGS

FIG. 5a is a perspective view of a base unit and plate according to the fifth and presently preferred embodiment of the invention, as the operation of fastening the base unit to the plate is being commenced.

FIG. 5b is a perspective view of the base unit and plate of the fifth embodiment as the second phase of the fastening operation is underway.

FIG. 5c is a perspective view of the base unit and plate of the fifth embodiment of the invention showing the base unit and plate attached.

FIG. 5d is a perspective view of section "A" of FIG. 5c, showing in detail the notch and detent used to hold the base unit and plate together, and the tab used to separate them.

DETAILED DESCRIPTION

Figure 1:
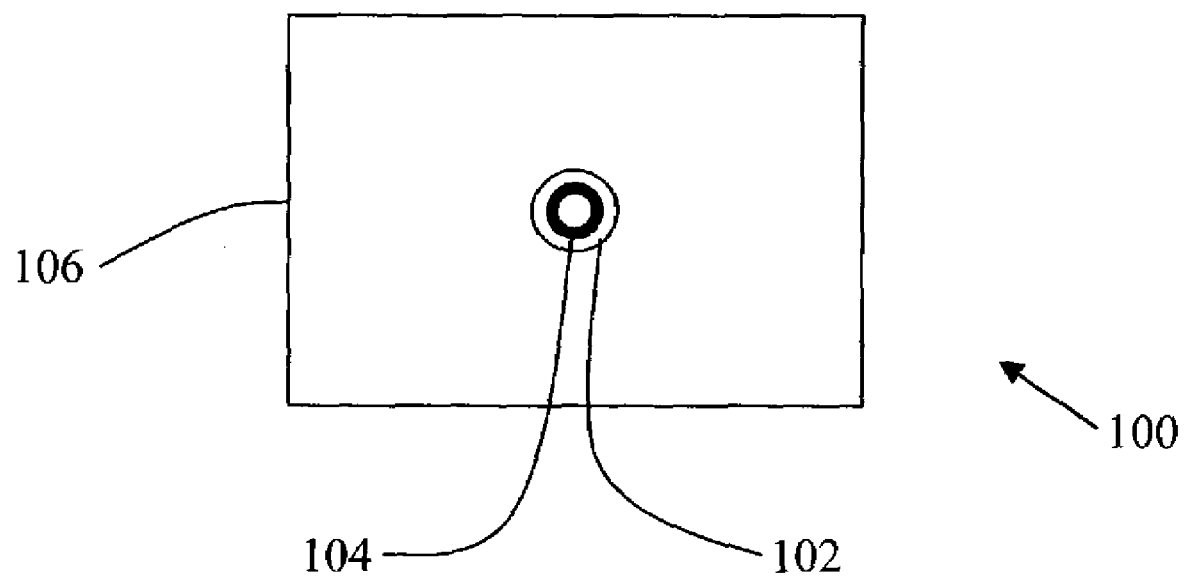
FIG. 1 is a top view of a plate according to the first embodiment of the invention.
Figure 4A:
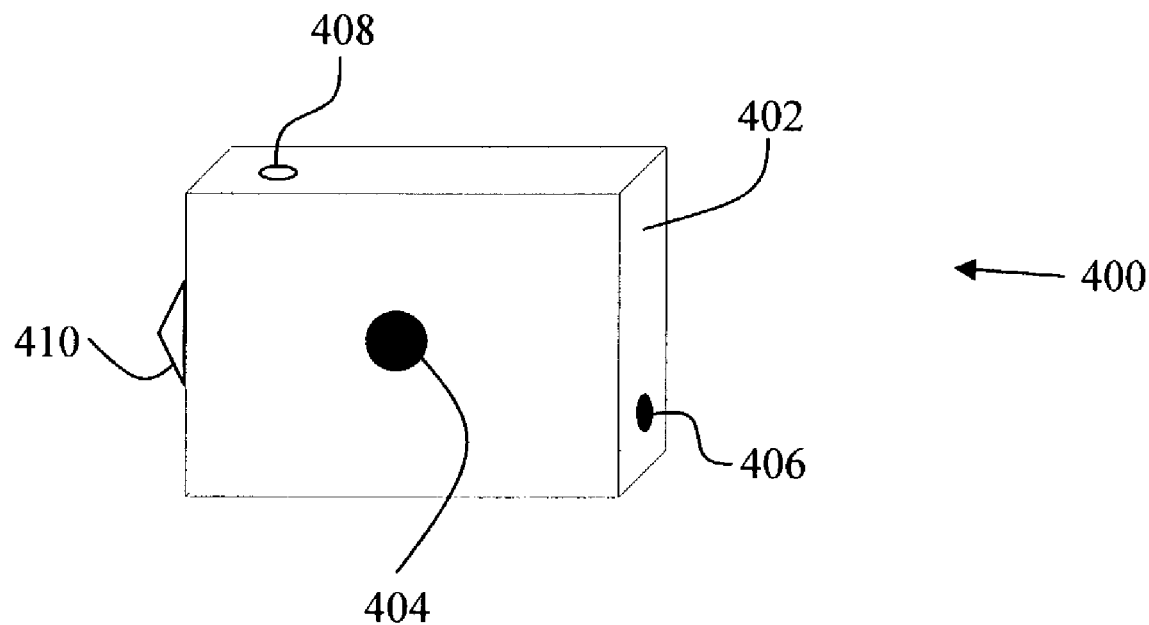
FIG. 4a is a rear perspective view of a base unit according to a fourth embodiment of the invention.
Figure 4B:
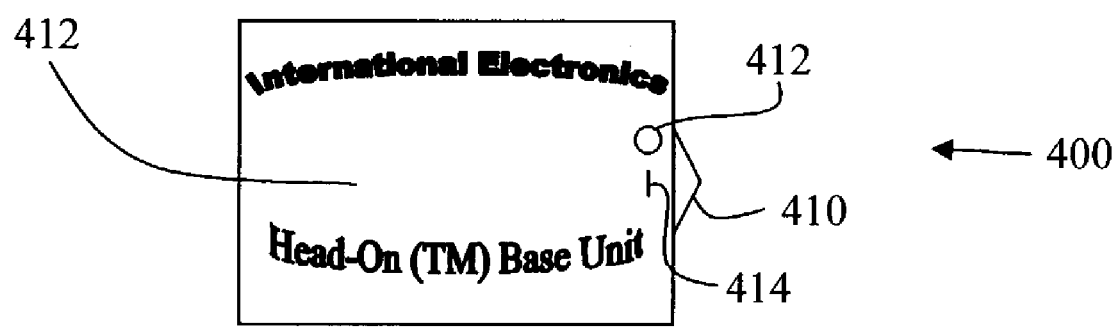
FIG. 4b is a front view of the base unit of the fourth embodiment of the invention.

FIG. 1 is a top view of a plate according to the first embodiment of the invention. The device of the present invention allows fastening of a base unit of a wireless headset to a surface. Device 100 has a substantially flat plate 106 having first and second sides, although in FIG. 1 only the first side may be seen. Plate 106 has upon the first (visible) side a first fastener portion 102; pictured as being part of an ordinary plastic "snap" but potentially almost any type of fastener may be used. First fastener portion 102 has a circular ridge 104, then bulges out wider below ridge 104. In practice, the first portion 102 is "snapped" into a receptacle (not shown) such as a small hole dimensioned and configured to accept first portion 102. Plate 106 has a thickness of 0.12 inches (roughly 3 millimeters), though this may be varied to suit circumstances. Plate 106 should be strong enough to securely hold the device to be "snapped" onto the plate (a wireless headset base unit such as seen in FIGS. 4a, 4b) without chance of the device falling off accidentally. Substantially flat obviously does not allow a perfect plane having no thickness: a substantially flat plate has a small thickness. It may also have a certain degree of irregularity in all three dimensions, for example, a plate may be custom shaped to fit a particular portion of a certain popular type of cell phone and thus be gently curved, have modest angles and so on.

Figure 2:
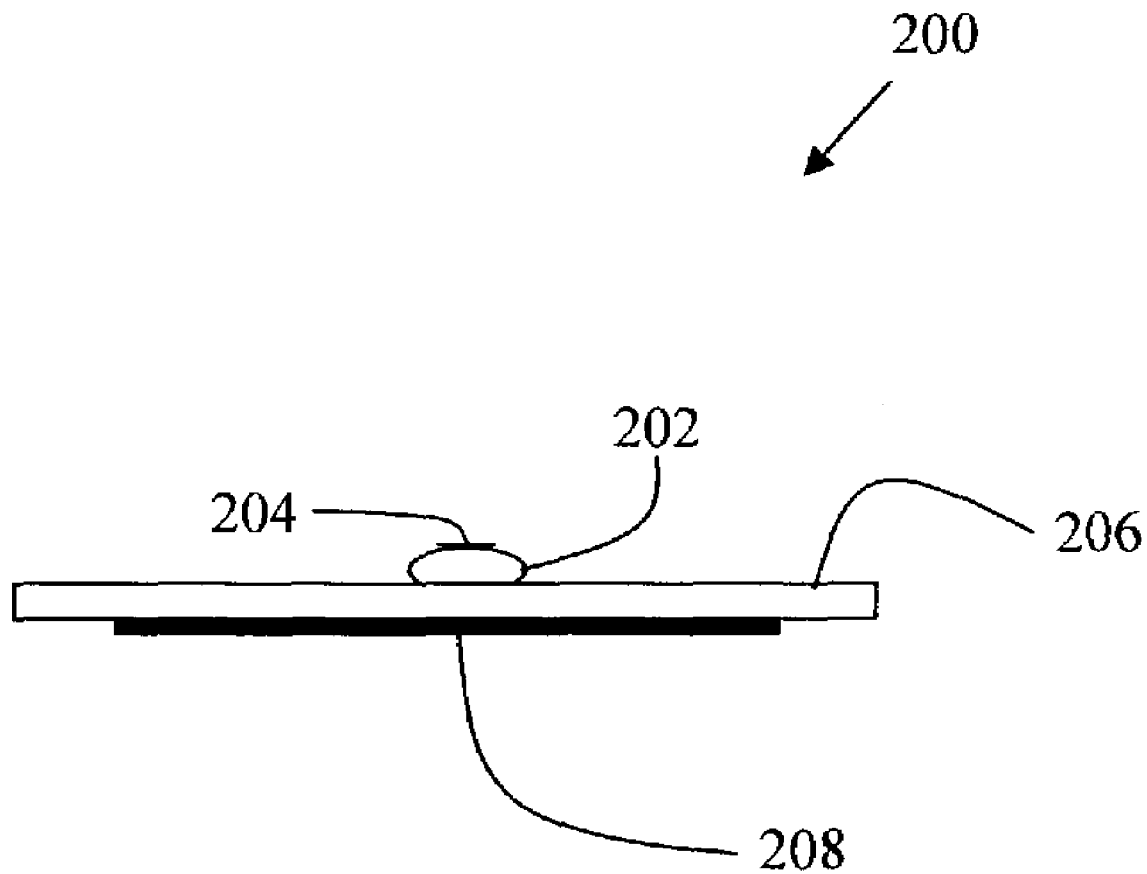
FIG. 2 is a side view of a plate according to a second embodiment of the invention.

FIG. 2 is a side view of a device 200 according to a second embodiment of the invention. This embodiment is similar to the first embodiment, having plate 206 with fastener 202 having ridge 204 on a first side. Plate 206 further has upon the second side means for affixing the plate to such surface; adhesive 208 may be an example. Adhesive 208 may be a strong and permanent type of adhesive, as there is no need to remove device 200 from the surface to which it is affixed/adhered. In the event that the base unit (not shown in FIG. 2, see FIGS. 4a, 4b) is to be removed from the surface, the base unit may be detached from the plate at first fastener portion 202.

A base unit to be used with the invention may have a second fastener portion affixed thereto by means of another such plate having the second fastener portion thereon, or by having the second fastener portion built into the case of the base unit or otherwise made with the base unit, or by other device. The first and second fastener portions are dimensioned and configured to engage one another. This engagement in the preferred embodiment described later is physical, as magnetic engagement might interfere with the electronic devices within the base unit or the cell phone/office equipment having the surface to which the plate is affixed. Thus, magnetic engagement is not the preferred embodiment of the present invention and physical engagement is the preferred embodiment and best mode now contemplated for carrying out the invention.

The device of the present invention may further comprise yet a third fastener portion upon the first side of the plate; and a fourth fastener portion affixed to such base unit. The third and fourth fastener portions may be dimensioned and configured to engage with each other and thus further secure the base unit to the cell phone/telephone/desk/office equipment to which it is affixed.

The first and second fastener portions together may be a wide variety of fasteners, including one member selected from the group consisting of: metal snaps, plastic snaps, hooks, clasps, clips, fabric hooks, magnets, loop, detent, latches and combinations thereof. Fabric hooks, such as those sold under the trade name VELCRO, may be used regardless of trade name and source, and the fabric to which the hooks engage may be on the base unit (with the fabric hooks on the plate) or vice-versa. Similarly, in the case of traditional snap fasteners, the "male" portion of the fastener may be upon the plate (as shown in FIG. 1 and FIG. 2) and the "female" portion of the fastener may be upon the base unit (as will be shown in regard to FIGS. 4a, 4b). This method allows for a thinner plate. However, in other embodiments, this may be reversed.

Figure 3:
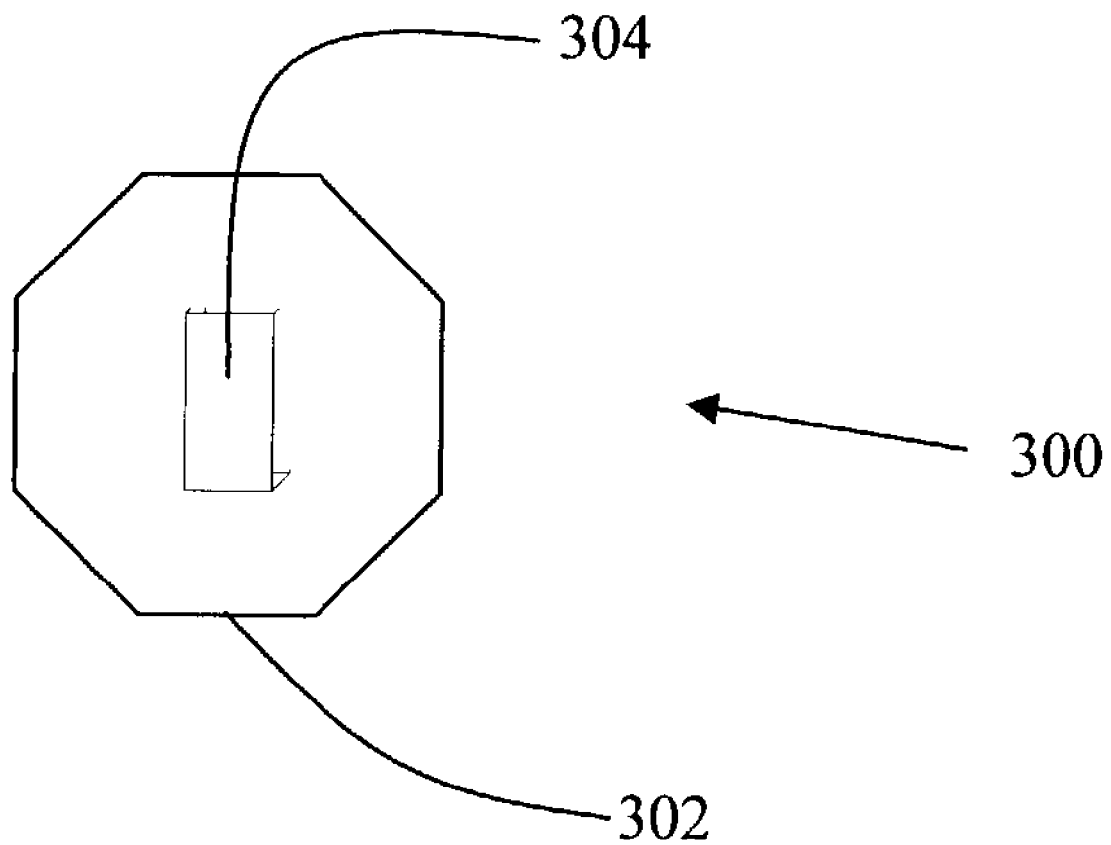
FIG. 3 is a perspective view of a plate according to a third embodiment of the invention.

FIG. 3 is a perspective view of a device 300 according to a third embodiment of the invention. Plate 302 has upon it first fastener portion 304, a clip or hook. Plate 302 may be said to have either a "generally circular" planform or more specifically an octagonal planform. In general, the planform of the plate may be, but is not limited to, one member selected from the group consisting of: circular shapes, elliptical shapes, rectangular shapes, elongate shapes, triangular shapes, square shapes, trapezoidal shapes, regular geometrical shapes, irregular shapes and combinations thereof. These general shapes, which may be altered without departing from the scope of the invention, may serve as the basis for other shapes or combination/compound shapes.

Since first fastener portion 304 is in this embodiment a clip or hook, the second fastener portion on the base unit may advantageously comprise a complementary clip, hook, loop, detent, latch, etc.

FIG. 4a is a rear perspective view of a base unit according to a fourth embodiment of the invention, while FIG. 4b is a front view of the base unit of the fourth embodiment of the invention. Base unit 400 has case 402, second fastener portion 404 thereon, a jack 406, LCD indicator 408, switch 410, "On" position icon 412, "Off" position icon 414, and potentially other matters such as advertising, identification, instructions and so on. These components may also be reduced in number and size as well. For example, switch 410 may be omitted in embodiments, as may LDC 408, and others. Second fastener portion 404, however, is used to attach the unit to a plate such as the plates shown in FIGS. 1, 2, 3. Second fastener portion 404 is pictured as being a "female" portion of a snap which has been sunk into case 402 so as to save space and leave the surface of base unit 400 as uncluttered as possible. Counter-sinking of second fastener portion 404 into case 402 presents another advantage: it allows base unit 400 to sit very nearly flush against a plate such as plate 200 and thus minimize the size and projection of base unit 400 from the cell phone or office item to which it is attached. First and second fastener portions may also be reversed in terminology, or by having a "male" fastener portion upon the case and the "female" portion upon the plate. The base unit for the wireless headset is therefore the base unit suitable for being secured to a surface. Note that the base unit in all embodiments also comprises a case having disposed therein transceiver circuitry in communication with such wireless headset.

One important aspect of the invention which is difficult to convey in dimensionless diagrams is that the type, dimensions and configurations of the fasteners used (in particular first and second fastener portions) are standardized; whereby interoperability and portability of a plurality of base units among a plurality of surfaces is maintained. In use, this means that a given base unit may be removed from a given surface and replaced with another base unit, or transferred to another surface equipped with a plate of the invention. Thus a number of base units could be transferred among a number of items of office equipment, office telephones, office computers, POS stations, stations, desks, cell phones, etc, quite easily.

Size reduction is increasingly important in this field, as the cellular telephones to which many such devices will connect are becoming smaller with the passage of time. For example, the applicant presently markets a base unit (sans present invention) which is approximately the size of a postage stamp. Thus making the second fastener portion a part of the unit's case helps size reduction. Similarly, usage of small sized fasteners falls within the scope of the invention, as the presently preferred embodiment illustrated in FIG. 5a–5d demonstrates.

FIG. 5a is a perspective view of a base unit and plate according to the fifth and presently preferred embodiment of the invention, as the operation of fastening the base unit to the plate is being commenced. Base unit 502 has battery cover 506. The battery disposed within battery cover 506 may be a standard hearing aid or camera "coin" battery: this shows the diminutive size possible in the presently preferred embodiment. Antenna 508 is used to establish RF communication with the headset unit or units paired with base unit 502. Latch 510 projects downward from the bottom of base unit 502 and has a catch portion (not visible) which projects inwardly from the extreme end of latch 510 and is used to hold base unit 502 to plate 516.

Plate 516 has immovable/immobile first tab 514 which cooperates with latch 510 when base unit 502 is secured to plate 516: first tab 514 projects from the side of plate 516 and is dimensioned and configured to engage latch 510 in the secured position. This prevents motion in the vertical plane except during the first phase of the securing or second phase of the releasing operation. Plate 516 also has an irregular top surface 504 on the circumference of which tab 514 and like securing devices may be disposed. Top surface 504 may be irregular (rather than exactly flat) in order to lend strength to plate 516, in order to allow it to more closely conform to base unit 502, in order to allow it to conform more closely to the surface to which it may be attached (not shown) or for other reasons. Finally, though it is not shown plate 516 may have upon the invisible lower surface an adhesive capable of permanently and securely fastening it to a surface such as part of a cellular telephone, an office telephone, a desk, a computer, a workstation, etc.

In practice, base unit 502 is lowered onto plate 516 in the direction depicted by arrow 512. FIG. 5b is a perspective view of base unit 502 and plate 516 of the fifth embodiment as the second phase of the fastening operation is underway: base unit 502 is slid sideways along plate 516 in the direction depicted by arrow 518. FIG. 5c is a perspective view of base unit 502 and plate 516 of the fifth embodiment of the invention showing them attached together/secured together. In the preferred embodiment, the planform of base unit 502 and the planform of plate 516 are substantially similar, allowing the invention to present a single smooth contour and thus minimizing the chance of the invention 'catching' upon something and being subjected to forces likely to damage or dislocate it.

Section 'A' of FIG. 5c is shown in enlarged in FIG. 5d, which is a perspective view of section "A" of FIG. 5c, showing in detail the notch and detent used to hold the base unit and plate together, and the tab used to separate them when removal is desired. Notch 520 on base unit 502 and detent 524 on movable second tab 522 of plate 516 are dimensioned and configured to engage with one another and thus prevent motion in the horizontal plane. In this embodiment, detent 524 engages with notch 520 by sliding sideways along the bottom of base unit 502 during the second phase of motion depicted by arrow 518. At this point, detent 524 actually pushes movable second tab downwards slightly (visible in FIG. 5b). When detent 524 slides upward into notch 520, base unit 502 and plate 516 are secured together.

Removal is the reverse process, with the additional first step of depressing movable first tab 522 in order to withdraw detent 522 from notch 520.

In alternative embodiments, instead of a first vertical and second horizontal phase of motion to secure together the units, a twisting motion may be employed, or other types of motions.

As the plates may be sold in complementary pairs, it is absolutely NOT essential to the invention that a second fastener portion be "built into" the base unit. On the contrary, in one alternative embodiment of the invention, the second fastener portion is also placed upon a plate which plate may in turn be permanently affixed to the base unit. By that embodiment, the invention may be retrofitted to base units which did not previously have the device of the invention. Thus the second fastener portion may be adhesively affixed to the base unit, may be integral with the base unit or may be otherwise attached to the base unit in a manner which may be permanent. In such an embodiment, the invention has two plates, each with a fastener portion: a first substantially flat plate having first and second sides; and upon the first side a first fastener portion; and also has upon the second side means for affixing the plate to such surface. The second plate in this embodiment has "third" and "fourth" sides (so numbered to avoid confusion with the first and second sides of the first plate). The second plate has upon the third side a second fastener portion; and has upon the fourth side means for affixing the plate to such wireless headset base unit. The first and second fastener portions are dimensioned and configured to engage one another.

The "plate" of the invention is a convenient term for a device having a fastener upon it and able to be affixed to small surfaces on small devices. A "button" may be used as well, or the fastener portion may have a small surface of its own or other fastening mechanism allowing fixture to a small surface, or other equivalents may fall within the scope of the invention as claimed below and may be used in substitution for a strict "plate".

In preferable embodiments, the plate is not affixed over flat antennas which may be built under the surface of certain types of common cellular telephones. Also in preferable embodiments, the plate is not affixed over batteries or battery covers which may become hot during usage. In addition, the plate of preferred embodiments is not affixed over any removable portion of the device to which it is affixed, in a location which would interfere with cooperation between the device and a fourth unit (such as in a position which would interfere with a cell phone being placed into a charging cradle).

The plate may be composed of a metal, a sturdy plastic, another polymer, ceramic or may be composite in nature. In general, the plate should be strong enough to carry the modest structural loads imposed upon it, and should also not impair electronic operations of the base unit, the wireless headset, or the device to which the base unit is secured. Thus, in certain embodiments RF transparent materials may be preferable.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A system for affixing a base unit of a wireless headset to a surface, comprising:
   a plate having a first side, a second side, and a lateral edge;

means for attaching said first side of said plate to the surface attached to said plate;

a tab extending from said lateral edge of said plate and including a detent formed thereon;

said base unit having a lateral rim including a notch formed therein and a latch extending from said base unit;

wherein said detent of said tab and said notch of said base unit are adapted for positioning in cooperative interlocking relationship to prevent movement of said plate relative to said base unit in a first direction; and wherein said latch is adapted for engagement with said lateral edge of said plate to prevent movement of said plate relative to said base unit in a second direction.

2. The system of claim 1, wherein said latch is L-shaped.

3. The system of claim 2, wherein said plate includes an indentation formed along said lateral edge that is dimensioned to accept said latch.

4. The system of claim 1, wherein said base unit and said plate are engaged with each other by sliding said base unit relative to said plate to position said detent in said notch.

5. The system of claim 1, wherein said plate and said base unit are disengaged from each other by sliding said base unit relative to said plate to remove said detent from said notch.

6. The system of claim 5 wherein movement of said tab is required to disengage said notch from said detent.

7. The system of claim 1, wherein said base unit includes a plurality of latches extending perpendicularly to said second plane for engaging said lateral edge of said plate.

8. The system of claim 1, wherein said means for attaching said plate to said surface comprises an adhesive strip.

9. The system of claim 1, wherein said means for attaching said plate to said surface comprises one member selected from the group consisting of a metal snap, a plastic snap, a hook, a clasp, a clip, a magnet, and a loop.

10. The system of claim 1, wherein said base unit further comprises circuitry for communicating wirelessly with a headset.

* * * * *